US 6,610,113 B1

(12) United States Patent
Mehrotra et al.

(10) Patent No.: US 6,610,113 B1
(45) Date of Patent: Aug. 26, 2003

(54) PROCESS FOR HEAT TREATING CERAMICS AND ARTICLES OF MANUFACTURE MADE THEREBY

(75) Inventors: Pankaj K. Mehrotra, Greensburg, PA (US); Mark A. Garman, Johnstown, PA (US); Chuck E. Lipniskis, Greensburg, PA (US); Frank B. Battaglia, Latrobe, PA (US)

(73) Assignee: Kennametal PC Inc., Latrobe, PA (US)

( * ) Notice: Subject to any disclaimer, the term of this patent is extended or adjusted under 35 U.S.C. 154(b) by 0 days.

(21) Appl. No.: 09/576,833

(22) Filed: May 22, 2000

Related U.S. Application Data

(63) Continuation-in-part of application No. 09/393,004, filed on Sep. 9, 1999, now abandoned.

(51) Int. Cl.[7] .................. C04B 35/18; C04B 35/453; C04B 35/599
(52) U.S. Cl. ................. 51/308; 264/655; 264/665; 407/119
(58) Field of Search .................... 51/308; 264/655, 264/651; 407/119

(56) References Cited

U.S. PATENT DOCUMENTS

| | | | |
|---|---|---|---|
| 4,011,108 A | 3/1977 | Hellman et al. | 148/11.5 P |
| 4,038,092 A | 7/1977 | Baumgartner et al. | 106/73.4 |
| 4,127,416 A | 11/1978 | Lumby et al. | 106/73.2 |
| 4,227,842 A | 10/1980 | Samanta et al. | 409/131 |
| 4,264,548 A | 4/1981 | Ezis | 264/65 |
| 4,264,550 A | 4/1981 | Ezis | 264/85 |
| 4,286,905 A | 9/1981 | Samanta | 409/132 |
| 4,296,065 A | 10/1981 | Ishii et al. | 264/325 |
| 4,388,085 A | 6/1983 | Sarin et al. | 51/307 |
| 4,401,617 A | 8/1983 | Ezis et al. | 264/332 |
| 4,406,667 A | 9/1983 | Sarin et al. | 51/295 |
| 4,406,668 A | 9/1983 | Sarin et al. | 51/295 |
| 4,409,003 A | 10/1983 | Sarin et al. | 51/295 |
| 4,409,004 A | 10/1983 | Sarin et al. | 51/295 |

(List continued on next page.)

FOREIGN PATENT DOCUMENTS

| | | |
|---|---|---|
| DE | 3938644 | 5/1990 |
| DE | 3939989 | 7/1990 |
| DE | 4000777 | 8/1990 |
| EP | 0107919 | 5/1984 |
| EP | 0298936 | 1/1989 |
| EP | 0497355 | 8/1992 |
| EP | 0499861 | 8/1992 |
| EP | 0589997 | 4/1994 |
| EP | 0615963 | 9/1994 |
| EP | 0472256 | 8/1995 |
| JP | 6252192 | 3/1987 |
| JP | 0354143 | 3/1991 |
| JP | 3193666 | 8/1991 |
| JP | 4136174 | 5/1992 |
| WO | 9114017 | 9/1991 |
| WO | 9718177 | 5/1997 |
| WO | 9735817 | 10/1997 |

OTHER PUBLICATIONS

Sivasankaran et al., "Wear of Ceramic Tools in Machining Cast Iron", pp. 293–301 (no date).

(List continued on next page.)

Primary Examiner—John J. Zimmerman
Assistant Examiner—Jason Savage
(74) Attorney, Agent, or Firm—John J. Prizzi

(57) ABSTRACT

A process for making a heat treated ground ceramic cutting tool and the resultant cutting tool. The process comprising the steps of: providing an uncoated ground ceramic cutting tool having at least a portion thereof ground; and heat treating the uncoated ground ceramic cutting tool so as to form the heat treated ground ceramic cutting tool.

5 Claims, 4 Drawing Sheets

U.S. PATENT DOCUMENTS

| | | | |
|---|---|---|---|
| 4,416,670 A | 11/1983 | Sarin et al. | 51/295 |
| 4,421,525 A | 12/1983 | Sarin et al. | 51/295 |
| 4,431,431 A | 2/1984 | Sarin et al. | 51/295 |
| 4,433,979 A | 2/1984 | Sarin et al. | 51/307 |
| 4,434,238 A | 2/1984 | Ezis et al. | 501/98 |
| 4,440,547 A | 4/1984 | Sarin et al. | 51/295 |
| 4,440,707 A | 4/1984 | Shimamori et al. | 264/65 |
| 4,441,894 A | 4/1984 | Sarin et al. | 51/295 |
| 4,449,989 A | 5/1984 | Sarin et al. | 51/295 |
| 4,497,228 A | 2/1985 | Sarin et al. | 82/1 C |
| 4,563,433 A | 1/1986 | Yeckley et al. | 501/97 |
| 4,575,449 A | 3/1986 | Lueth | 419/26 |
| 4,607,017 A | 8/1986 | Wolfe et al. | 501/98 |
| 4,609,633 A | 9/1986 | Fukuhara et al. | 501/97 |
| 4,632,910 A | 12/1986 | Lee et al. | 501/97 |
| 4,640,693 A | 2/1987 | Bhat et al. | 51/295 |
| 4,650,498 A | 3/1987 | Buljan | 51/309 |
| 4,652,276 A | 3/1987 | Burden | 51/308 |
| 4,670,024 A | 6/1987 | Bhat et al. | 51/295 |
| 4,711,644 A | 12/1987 | Yeckley et al. | 51/307 |
| 4,743,571 A | 5/1988 | Steinmann et al. | 501/97 |
| 4,745,022 A | 5/1988 | Miyake et al. | 428/216 |
| 4,769,350 A | 9/1988 | Nishioka et al. | 501/98 |
| 4,789,277 A | 12/1988 | Rhodes et al. | 409/131 |
| 4,843,039 A | 6/1989 | Akesson et al. | 501/87 |
| 4,848,984 A | 7/1989 | Ezis et al. | 51/309 |
| 4,880,755 A | 11/1989 | Mehrotra | 501/96 |
| 4,881,950 A | 11/1989 | Bhat et al. | 51/307 |
| 4,892,792 A | 1/1990 | Sarin et al. | 428/698 |
| 4,913,936 A | 4/1990 | Mehrotra et al. | 427/249 |
| 4,946,630 A | 8/1990 | Ezis | 264/65 |
| 4,959,331 A | 9/1990 | Mehrotra et al. | 501/89 |
| 4,959,332 A | 9/1990 | Mehrotra et al. | 501/89 |
| 4,960,735 A | 10/1990 | Mehrotra et al. | 501/89 |
| 4,961,757 A | 10/1990 | Rhodes et al. | 51/309 |
| 4,965,231 A | 10/1990 | Mehrotra et al. | 501/89 |
| 5,024,976 A | 6/1991 | Mehrotra et al. | 501/89 |
| 5,034,022 A | 7/1991 | Bhat et al. | 51/307 |
| 5,049,531 A | 9/1991 | Nakanishi et al. | 501/98 |
| 5,079,198 A | 1/1992 | Edler et al. | 501/98 |
| 5,110,770 A | 5/1992 | Brandt et al. | 501/89 |
| 5,122,485 A | 6/1992 | Akimune | 501/92 |
| 5,171,723 A | 12/1992 | Moriguchi et al. | 501/97 |
| 5,198,165 A | 3/1993 | Akimune et al. | 264/65 |
| 5,234,643 A | 8/1993 | Matsumoto | 264/65 |
| 5,250,477 A | 10/1993 | Baldoni, II et al. | 501/95 |
| 5,264,297 A | 11/1993 | Jindal et al. | 428/698 |
| 5,294,575 A | 3/1994 | Matsumoto | 501/97 |
| 5,296,008 A | 3/1994 | Moriguchi et al. | 51/295 |
| 5,308,561 A | 5/1994 | Leimer et al. | 264/65 |
| 5,316,856 A | 5/1994 | Suzuki et al. | 428/446 |
| 5,326,733 A | 7/1994 | Mizuno et al. | 501/97 |
| 5,352,641 A | 10/1994 | Matsui et al. | 501/92 |
| 5,370,716 A | 12/1994 | Mehrotra et al. | 51/293 |
| 5,382,273 A | 1/1995 | Mehrotra et al. | 51/307 |
| 5,384,081 A | 1/1995 | Wotting et al. | 264/65 |
| 5,384,292 A | 1/1995 | Matsui et al. | 501/97 |
| 5,405,592 A | 4/1995 | Edler et al. | 423/344 |
| 5,411,923 A | 5/1995 | Suzuki et al. | 501/97 |
| 5,424,256 A | 6/1995 | Yoshimura et al. | 501/97 |
| 5,432,132 A | 7/1995 | Dasgupta et al. | 501/97 |
| 5,439,855 A | 8/1995 | Rosenthal | 501/97 |
| 5,445,776 A | 8/1995 | Honma et al. | 264/65 |
| 5,449,649 A | 9/1995 | Li et al. | 501/97 |
| 5,453,232 A | 9/1995 | Hida et al. | 264/65 |
| 5,455,000 A | 10/1995 | Seyferth et al. | 419/36 |
| 5,472,919 A | 12/1995 | Mitomo et al. | 501/97 |
| 5,502,011 A | 3/1996 | Yamamoto et al. | 501/97 |
| 5,525,134 A | 6/1996 | Mehrotra et al. | 51/307 |
| 5,541,143 A | 7/1996 | Hirosaki et al. | 501/92 |
| 5,545,362 A | 8/1996 | Hirosaki et al. | 264/65 |
| 5,545,597 A | 8/1996 | Yeckley | 501/98 |
| 5,571,760 A | 11/1996 | Pujari et al. | 501/97 |
| 5,628,590 A | 5/1997 | Beeghly et al. | 407/114 |
| RE35,538 E | 6/1997 | Akesson et al. | 501/87 |
| 5,668,069 A | 9/1997 | Sato et al. | 501/97.2 |
| 5,683,481 A | 11/1997 | Chatterjee et al. | 65/17.3 |
| 5,691,261 A | 11/1997 | Takahashi et al. | 501/97 |
| 5,705,449 A | 1/1998 | Hirao et al. | 501/97.1 |
| 5,720,917 A | 2/1998 | Matsuura et al. | 264/432 |
| 5,759,481 A | 6/1998 | Pujari et al. | 264/655 |
| 5,858,181 A | 1/1999 | Jindal et al. | 204/192.15 |

OTHER PUBLICATIONS

Beeghly et al., "Application–Specialized Ceramics: A Silicon Nitride for Machining Gray Cast Iron", pp. 91–99; ASM Conference: Tool Materials, Scottsdale, AZ (Feb., 1987).

Janardhana Reddy et al., "Comparative Studies of Ceramic and Tungsten Carbide Tools for Machining Grey Cast Iron," pp. 161–171; Conference: Advanced Ceramics; India (Mar. 1990).

Tennenhouse et al. "Interaction of Silicon Nitride and Metal Surfaces", J. Am.. Ceramic Soc. 68[1]C30–C31 (1985 (no month).

Agranov et al., "Wear Behavior of Hot Pressed Silicon Nitride in Cutting of Cast Iron", Ind. Ceramics vol. 8, No. 4 pp. 192–197 (1988) (no month).

Bhola et al. "Ceramic Cutting Tool Inserts", Key Engineering Materials, vols. 122–124 (1996), pp. 235–246 (no month).

Nishioka et al. "Mechanical Properties of $Si_3N_4$ Ceramics with ZrO2–addition under high temperature and observation of the micro–structure"(date unknown).

Falk et al. "Microstructure and Short Term Oxidation of Hot–Pressed $Si_3N_4/ZrO_2(+Y_2O_3)$ Ceramics", J. Am. Ceram. Soc., 75[1](1992) pp. 28–35 (no month).

Knutson–Wedel, "$Si_3N_4$ Ceramics Formed by HIP Uisng Additions of $ZrO_2$,", Ceramics Today–Tomorrow's Ceramics, Materials Science Monographs, 66B, Elsevier Sci. Publishers B.V. (1991) (no month).

PROCESS FOR HEAT TREATING CERAMICS AND ARTICLES OF MANUFACTURE MADE THEREBY

This patent application is a continuation-in-part of U.S. patent application Ser. No. 09/393,004, filed on Sep. 9, 1999, by Mehrotra et al., now abandoned.

FIELD OF THE INVENTION

The invention pertains to a process for making ceramics, as well as a ceramic article of manufacture.

More specifically, the invention pertains to a process for making a ceramic cutting tool that includes silicon nitride-based cutting tools, SiAlON-based cutting tools, alumina-based cutting tools, titanium carbonitride-based cutting tools, and ceramic whisker-reinforced ceramic cutting tools, such as, for example, a whisker-reinforced titanium carbonitride-based ceramic cutting tool and a whisker-reinforced alumina-based ceramic cutting tool.

BACKGROUND OF THE INVENTION

Heretofore, silicon nitride-based cutting inserts, and SiAlON-based cutting inserts, which are ceramic articles of manufacture, have been shown to be useful for many material removal applications. U.S. Pat. No. 4,127,416 to Lumby et al., U.S. Pat. No. 4,563,433 to Yeckley et al., U.S. Pat. No. 4,711,644 to Yeckley et al., U.S. Pat. No. 5,370,716 to Mehrotra et al., U.S. Pat. No. 5,382,273 to Mehrotra et al., U.S. Pat. No. 5,525,134 to Mehrotra et al., U.S. Pat. No. 4,880,755 to Mehrotra et al., and U.S. Pat. No. 4,913,936 to Mehrotra et al. disclose various SiAlON and silicon nitride compositions which are useful as cutting inserts. These patents are hereby incorporated by reference herein.

Heretofore, whisker-reinforced cutting inserts, which are also ceramic articles of manufacture, have also been shown to be useful for material removal application. These whisker-reinforced cutting inserts include alumina-based materials reinforced with silicon carbide whiskers such as shown and described in U.S. Pat. No. B2 4,789,277 to Rhodes et al. and U.S. Pat. No. 4,961,757 to Rhodes et al. wherein these Rhodes et al. patents are hereby incorporated by reference herein. A whisker-reinforced alumina-based cutting insert with a zirconia addition is also shown and described in U.S. Pat. No. 4,959,332 to Mehrotra et al. wherein this patent is hereby incorporated by reference herein. A whisker-reinforced titanium carbonitride-based cutting insert is shown and described in PCT Patent Application No. PCT/US96/15192 (International Filing Date of Sep. 20, 1996) [International Publication No. WO 97/18177 published on May 22, 1997] for a WHISKER REINFORCED CERAMIC CUTTING TOOL AND COMPOSITION THEREOF [as well as in U.S. patent application Ser. No. 08/874,146 filed Jun. 13, 1997 to Mehrotra] wherein these patent applications are hereby incorporated by reference herein.

While the cutting inserts made from the materials of the above patents and patent application exhibit an acceptable performance in material removal applications such as, for example, milling and turning, there remains as an objective the production of ceramic cutting inserts (e.g., silicon nitride-based cutting inserts, SiAlON-based cutting inserts, alumina-based cutting inserts, titanium carbonitride-based cutting inserts, and whisker-reinforced ceramic cutting inserts) with still better performance characteristics in material removal applications. There also remains as an objective the production of ceramic cutting inserts (e.g., silicon nitride-based cutting inserts, SiAlON-based cutting inserts, alumina-based cutting inserts, titanium carbonitride-based cutting inserts, and whisker-reinforced ceramic cutting inserts) that exhibit a microstructure that results in better physical properties and performance characteristics.

SUMMARY OF THE INVENTION

In one form thereof, the invention is a process for making a heat treated ground ceramic cutting insert comprising the steps of: providing an uncoated ground ceramic cutting insert having at least a portion thereof being ground; and heat treating the uncoated ground ceramic cutting insert so as to form the heat treated ground ceramic cutting insert.

In another form thereof, the invention is a heat treated ground ceramic cutting insert produced by the process comprising the steps of: providing an uncoated ground ceramic cutting insert having at least a portion thereof being ground; and heat treating the ground ceramic cutting insert so as to form the heat treated ground ceramic cutting insert.

In still another form thereof, the invention is a heat treated ground ceramic article of manufacture formed in the presence of a reaction source wherein the article of manufacture comprises a substrate which has a surface. The substrate presents a microstructure wherein there is a surface region extending inwardly from the surface of the substrate, and there is a bulk region inwardly of the surface region. The bulk region has a bulk composition. The surface region has a surface composition resulting from a reaction with the reaction source wherein the surface composition is different from the bulk composition.

In yet another form thereof, the invention is a process for making a heat treated ground ceramic article of manufacture comprising the steps of: providing an uncoated ground ceramic compact having at least a portion thereof being ground; and heat treating the uncoated ground ceramic compact so as to form the heat treated ground ceramic article of manufacture.

BRIEF DESCRIPTION OF THE DRAWINGS

The following is a brief description of the drawings which form a part of this patent application.

at a magnification of 1000X of the rake surface of an unground surface cutting insert blank of Mixture I.

DETAILED DESCRIPTION OF THE INVENTION

Figure 1:
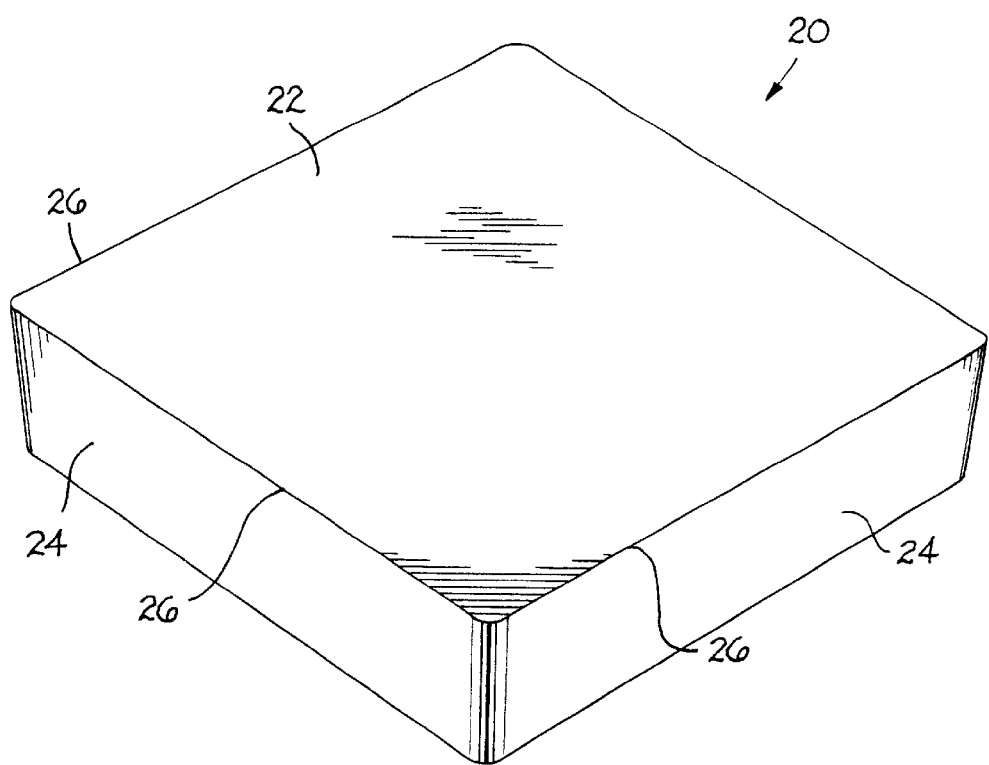
FIG. 1 is an isometric view of a cutting insert of the instant invention.

Referring to the drawings, there is shown in FIG. 1 a ceramic cutting insert generally designated 20. Cutting insert 20 has a rake surface 22, and flank surfaces 24. There are cutting edges 26 at the intersections of the rake surface 22 and the flank surfaces. The cutting insert of the instant invention may take on any one of a variety of cutting insert geometries so that applicant does not intend to limit the scope of the instant invention to the geometry of the specific cutting insert illustrated in FIG. 1 or the geometries set forth in the examples herein.

In regard to the production of the cutting inserts as used in the tests, the powder components were ball milled, dried, and then screened to form the powder mixture. Some powder mixtures to which the instant invention has application are described hereinafter. These powder mixtures included the four silicon nitride-based mixtures (Mixtures I through IV) set forth in Table I below.

TABLE I

Composition (Weight Percent)
of Silicon Nitride-Based Starting Powder Mixtures I–IV

| Mixture | Silicon Nitride | Aluminum Nitride | Aluminum Oxide | Magnesia | Yttria |
|---|---|---|---|---|---|
| I | 98.0 | — | — | 1.0 | 1.0 |
| II | 85.4 | 6.2 | 3.7 | — | 4.7 |
| III | 63.3 | 9.3 | 22.7 | — | 4.7 |
| IV | 91.6 | 1.6 | 1.3 | — | 5.5 |

The powder components set forth in Table I hereinabove are briefly described as follows. For Mixtures I and III, the silicon nitride is Grade SNE10 silicon nitride powder from Ube Industries, Ltd. of Tokyo, Japan. For Mixture II, the silicon nitride is a lower purity nitrided silicon nitride powder available from Herman C. Starck, Inc. of New York, N.Y. (USA). For Mixture I–V, the silicon nitride powder is Grade LC10 or M11 available from Herman C. Starck, Inc. For Mixtures I–IV, the aluminum nitride is Grade C AlN powder available from Herman C. Starck, Inc. of New York, N.Y. (USA). For Mixtures I–IV, the alumina is Grade Ceralox HPA 0.5 and is available from Ceralox Corporation of Tucson, Ariz. (USA). For Mixtures I–IV, the yttria powder is fine grade yttria from Herman C. Starck, Inc. of New York, N.Y. (USA). More detailed descriptions of these powders is found in U.S. Pat. No. 5,370,716 to Mehrotra et al., which has already been incorporated by reference herein.

The powder mixtures to which the invention pertains further include silicon carbide whisker-reinforced ceramics, alumina-based ceramics, and titanium carbonitride-based ceramics. Examples of these powder mixtures, which are identified as Mixtures V, VI and VII, are set forth in Table II hereinbelow.

TABLE II

Composition (Weight Percent) of
Silicon Carbide Whisker ($SiC_w$)-Reinforced Ceramic,
Alumina-Based Ceramic and
Titanium Carbonitride-Based Ceramic
Starting Powder Mixtures V, VI and VII

| Mixture | Zirconia | Alumina | Titanium Carbonitride | $SiC_w$ | Other |
|---|---|---|---|---|---|
| V | 14.2 | Balance | None | 1.2 | 2.3 $MgAl_2O_4$; 0.14 $SiO_2$; 0.02 CaO |
| VI | None | 34.4 | Balance | 19.1 | 0.3 $Y_2O_3$ |
| VII | None | Balance | None | 25 | 500 ppm MgO as $MgAl_2O_4$ |

These powder mixtures of Mixtures I through VII can be consolidated by a variety of methods including pressing, sintering, hot isostatic pressing, hot pressing and other methods known in the literature.

As one example, the processing parameters for the powder Mixture I to make the cutting inserts, after the blending of the powder components the powder mixture was uniaxially pressed into green ceramic cutting insert compacts. These green cutting insert ceramic compacts were loaded into a silicon carbide lined graphite pot, and the green cutting insert compacts were surrounded by a protective setting powder. The setting powder was a silicon nitride-based powder with minor amounts of one or more of alumina, yttria, magnesia, carbon, silicon carbide and boron nitride or their reaction products contained therein.

The pot with the green cutting insert compacts therein was loaded into a batch sintering furnace and the green cutting insert compacts were then batch sintered at 1815 degrees Centigrade for 270 minutes in one atmosphere of nitrogen. The resultant product was a sintered ceramic cutting insert compact. After completion of the sintering, the sintered ceramic cutting insert compacts were hot isostatically pressed at 1750 degrees Centigrade at a pressure of 20,000 pounds per square inch (psi) of nitrogen for a duration of 60 minutes. The resulting products were uncoated unground fully dense cutting insert blanks, i.e., as-molded cutting insert blanks with an unground surface. At this point in the processing, these unground as-molded cutting insert blanks correspond to the characterization as "unground surface" cutting inserts (or cutting insert blanks) as found in Table III through Table IX herein. Other methods of powder densification may include sintering (without HIPing), hot pressing, encapsulated HIPing, sintering without a protective powder cover, and other methods known in the literature.

In order to form an uncoated ground ceramic cutting insert, i.e., a cutting insert that corresponds to the characterization "ground surface" cutting insert as found in Table III through Table IX herein, unground surface cutting insert blank was subjected to a grinding process wherein the top surface, the bottom surface, and the periphery were ground to dimension and T land cutting edges were ground.

It should be appreciated that the grinding step may also comprise a honing step or the like. The grinding or honing step may also impact only a portion of the uncoated unground ceramic cutting insert blank so that only a portion of the uncoated ground ceramic cutting insert would be ground or honed. It is intended that in the preferred process the grinding (or honing) step occur on a sintered article which is at least substantially fully dense (i.e., closed porosity).

For fabrication by hot pressing, a plate or disk may be hot pressed to full density, cut (or diced) into desired shapes, and finish ground. Alternatively, near net shape hot pressed cutting insert blanks may be finish ground.

In order to make a heat treated ground ceramic cutting insert, i.e., a cutting insert that corresponds to the characterization "ground & heat treated" cutting insert in Table III through Table IX, the ground ceramic cutting inserts of Mixture I were loaded into a silicon carbide lined graphite pot, and these cutting inserts were surrounded by a protective setting powder. The setting powder was a silicon nitride-based powder with minor amounts of one or more of alumina, yttria, magnesia, carbon, silicon carbide and boron nitride or their reaction products contained therein. The use of the protective setting powder is an optional feature of the process and is presented here only as an example.

The pot with the standard ground cutting inserts therein was loaded into a batch sintering furnace and the standard ground cutting inserts were heat treated at a temperature of 1815 degrees Centigrade for a duration of 270 minutes at a pressure of one atmosphere nitrogen. The duration of the heat treatment may range between about 15 minutes and about 6 hours. The preferred heat treatment temperature range for silicon nitride-based ceramics is between about 1600 degrees Centigrade and about 2200 degrees Centigrade. The preferred heat treatment temperature range for the other ceramic compositions described herein is between about 1300 degrees Centigrade and about 1700 degrees Centigrade.

After completion of the heat treatment, the cutting inserts were furnace cooled. As previously mentioned, the ceramic cutting inserts that result from this heat treatment correspond to the cutting inserts characterized as "ground & heat treated" in Table III through Table IX herein.

Even though the above description pertains to a batch furnace, the process may take place in a continuous furnace.

Although the processing conditions may vary, the post-grinding heat treatment is intended to comprise a heat treatment wherein there may or may not be some liquid phase which forms, and there may or may not necessarily be any further significant densification which occurs due to the post-grinding heat treatment. Also, the post-grinding heat treatment may or may not involve a setting powder and may be accomplished at pressures ranging between sub-atmospheric to about 30,000 psi.

Although the above process to make the heat treated ground cutting inserts included the step of grinding the uncoated ceramic cutting insert blanks (i.e., unground surface cutting insert blanks) prior to the heat treating step, it should be appreciated that some of the grinding steps may occur after completion of the heat treating step. This is especially true for minor grinding steps which may occur after the heat treating step (e.g., on surfaces that are not critical for cutting performance such as holes, and top and bottom surfaces), on some or all surfaces. Still referring to post-heat treatment minor grinding steps, the cutting edges may be lightly ground or polished such that the advantages of the present invention are still retained over standard ground products (i.e., uncoated ground surface ceramic cutting inserts).

While the ground and heat treated cutting inserts described above were the result of the steps of sintering, hot isostatic pressing, grinding and heat treating, the heat treated ground cutting inserts can be made from the steps of sintering, hot isostatic pressing, pre-grinding heat treatment, grinding, and a post-grinding heat treatment.

Other methods of manufacture are applicable to the present invention. One additional method of manufacture includes the steps of: sintering, optionally hot isostatic pressing, grinding the cutting insert over its entire surface, and heat treating. Another method of manufacture includes the steps of: sintering, optionally hot isostatic pressing, grinding the cutting insert on the top surface and on the bottom surface and on the K-land, and heat treating. Still another method of manufacture includes the steps of: sintering, grinding the cutting insert over it entire surface, and heat treating the cutting insert. Finally, another method of manufacture includes the steps of: sintering, grinding the top surface and the bottom surface of the cutting insert, heat treating, and then grinding the K-land.

Although the details of the processing may vary, generally speaking the powder mixture of Mixture I may be processed to form an uncoated unground ceramic cutting insert blank according to the teachings of U.S. Pat. No. 5,382,273 to Mehrotra et al. and U.S. Pat. No. 5,525,134 to Mehrotra et al.

The same holds true for the powder mixture of Mixture II in that to form an uncoated unground ceramic cutting insert blank from Mixture II the powder mixture may be processed according to the teachings of U.S. Pat. No. 4,563,433 to Yeckley et al. In regard to the processing of the examples of Mixture II, in the post-sintering heat treatment the parts were set on top of the setting powder which was a boron nitride setting powder in a boron nitride box. The post-sintering heat treatment was at 1770 degrees Centigrade for a duration of two hours at a pressure of one atmosphere nitrogen in a continuous belt furnace.

Likewise for the powder mixture of Mixture III in that to form an uncoated unground ceramic cutting insert blank from Mixture III the powder mixture may be processed according to the teachings of U.S. Pat. No. 5,370,716 to Mehrotra et al. In regard to the processing of the examples of Mixture III, in the post-sintering heat treatment the parts were set on top of the setting powder which was a boron nitride setting powder in a boron nitride box. The post-sintering heat treatment was at 1725 degrees Centigrade for a duration of two hours at a pressure of one atmosphere nitrogen in a continuous belt furnace.

The ground and heat treated Mixture III cutting inserts were tested against prior art ground Mixture III cutting inserts in milling and turning.

The milling test was climb milling of Inconel 718 at 3000 sfm, 0.004 ipt, 0.100 inch depth of cut, dry, using four style RNG-45T0320 cutting inserts mounted in a two inch diameter Hertel 4.0060R232 milling cutter where the width of cut was 1.468 inches and the length/pass was 13 inches (actual cut time for each edge per pass=0.050 minutes). The heat treated Mixture III inserts had lifetime of 3.63 passes (average of two reps) and failed by maximum flank wear/chipping, whereas the prior art ground Mixture III inserts had a lifetime of 2.30 passes (average of two reps).

In eccentric bar turning of Inconel 718 using Mixture III RNG-45T0320 style inserts at 500 sfm, 0.006 ipr, and 0.040 depth of cut (flood coolant), the heat treated inserts according to the present invention had an average tool life of 4.1 minutes and the prior art ground inserts had an average tool life of 4.6 minutes.

Although the details of processing may vary, the powder mixture of Mixture IV was processed like that of Mixture I, except that the setting powder was silicon nitride-based with minor additions of one or more of alumina, yttria, and boron nitride, and the post-sintering heat treatment temperature was 1860 degrees Centigrade and the duration of the heat treatment was 130 minutes.

Although the details of the processing may vary, the powder mixture of Mixture V may be processed to form an uncoated unground ceramic cutting insert blank according to the teachings of U.S. Pat. No. 4,959,332 to Mehrotra et al. In regard to the processing of the examples of Mixture V herein, for the post-sintering heat treatment the parts were set on top of the setting powder which was a niobium carbide-based setting powder, and the temperature was 1650 degrees Centigrade for a duration of 60 minutes at a pressure of one atmosphere argon.

The same holds true for the powder mixture of Mixture VI in that to form an uncoated ground ceramic cutting insert blank from Mixture VI the powder mixture may be processed according to the teachings of PCT patent application No. PCT\US96\15192 [International Filing Date of Sep. 20, 1996] (as well as U.S. patent application Ser. No. 08/874,146 filed Jun. 13, 1997) to Mehrotra for a WHISKER REINFORCED CERAMIC CUTTING TOOL AND COMPOSITION THEREOF. In regard to the processing of the examples of Mixture VI herein, for the post-sintering heat treatment the parts were set on top of the setting powder which was a niobium carbide-based setting powder, and the temperature was 1650 degrees Centigrade for a duration of 60 minutes at a pressure of one atmosphere argon.

Additionally, although the details of processing may vary the powder mixture of Mixture VII may be processed to form an uncoated ground ceramic cutting insert blank according to the teaching of U.S. Pat. No. B2 4,789,277 to Rhodes et al. and U.S. Pat. No. 4,961,757 to Rhodes et al. In regard to the processing of the examples of Mixture VII herein, for the post-sintering heat treatment the parts were set on top of the setting powder which was a niobium carbide-based setting powder, and the temperature was 1650 degrees Centigrade for a duration of 60 minutes at a pressure of one atmosphere argon.

It should be understood based upon the processes described above, that a ground surface will be obtained when a sufficiently thick (i.e., 0.03 inches [0.762 millimeters] to 0.05 inches [1.27 millimeters]) layer is ground away from the ground and heat treated surface.

Table III set forth below presents the crystalline phases (as determined by X-ray diffraction) which exist in the microstructure of the sintered ceramic material made from the powder mixtures of Mixtures I through V when the ceramic material is in one of three conditions, i.e., the unground surface condition, the ground surface condition and the ground and heat treated condition. Along the lines of the above descriptions of these conditions, the use of the characterization "unground surface" in Table III through Table IX hereof means a sintered fully dense cutting insert blank that has not been ground after the initial sintering thereof. The use of the characterization "ground surface" in Table III through Table IX means a sintered fully dense cutting insert that has been ground, but has not been subjected to any post-grinding heat treatment. The use of the characterization "ground & heat treated" in Table III through Table IX means a sintered fully dense cutting insert that has been ground after the initial sintering treatment and then subjected to a post-grinding heat treatment.

TABLE III

Crystalline Phases Present in Mixtures I Through V

| Mixture/Condition | Unground Surface | Ground Surface | Ground & Heat Treated |
|---|---|---|---|
| I | $\beta\text{-}Si_3N_4$; $Y_2Si_3O_3N_4$ | $\beta\text{-}Si_3N_4$ | $\beta\text{-}Si_3N_4$; $Y_2Si_3O_3N_4$ |
| II | $\beta'$-sialon; 95% $\alpha'$-sialon; N-YAM | $\beta'$-sialon; 15–20% $\alpha'$-sialon | $\beta'$-sialon; 95% $\alpha'$-sialon; N-YAM |
| III | $\beta'$-sialon; 15R polytype | $\beta'$-sialon | $\beta'$-sialon; 15R polytype |
| IV | $\beta'$-sialon; N-melilite; N-$\alpha$-Wollastonite | $\beta'$-sialon; B-phase; N-$\alpha$-Wollastonite | $\beta'$-sialon; N-melilite |
| V | $Al_2O_3$; t-$ZrO_2$; m-$ZrO_2$; ZrO | $Al_2O_3$; t-$ZrO_2$; m-$ZrO_2$; SiC; $MgAl_2O_4$ | $Al_2O_3$; t-$ZrO_2$; m-$ZrO_2$; SiC; $MgAl_2O_4$; ZrO/ZrC |

The designation 15R is a polytype which is a single phase SiAlON of a rhombohedral crystal structure with the formula $SiAl_4O_2N_4$. This 15R polytype is described in U.S. Pat. No. 4,127,416 to Lumby et al. already incorporated by reference herein. The designation "t-$ZrO_2$" means tetragonal zirconia and the designation "m-$ZrO_2$" means monoclinic zirconia.

It should be appreciated that the present invention is also applicable to cutting inserts made of materials wherein the bulk substrate is $\alpha$-silicon nitride, $\alpha$-silicon nitride plus $\beta$-silicon nitride, $\alpha'$-SiAlON, and mixtures of ($\alpha$ and/or $\beta$) silicon nitride and ($\alpha'$ and/or $\beta'$) SiAlON. These compositions may have microstructures (other than intergranular phase or phases) which may optionally include additives in an amount up to 30 volume percent of the entire composition wherein these additives comprise the oxides of hafnium and/or zirconium, the carbides, nitrides and/or carbonitrides of titanium, silicon, hafnium and/or zirconium (e.g., titanium carbide, titanium nitride, titanium carbonitride, silicon carbide and hafnium carbide).

Referring now to the test results presented in Table IV set forth hereinafter, Tests Nos. 1 through 7 comprise a variety of tests that used cutting insert of Mixture I wherein the cutting inserts were either in the "unground surface" condition, the "ground surface" condition or the "ground & heat treated" condition. Test No. 8 comprised a milling test using a cutting insert of Mixture IV wherein the cutting inserts were in the "ground surface" and the "ground & heat treated" conditions.

Test No. 1 sets forth the test results of fly cut milling Class 40 Gray Cast Iron (GCI) in the form of blocks with holes therein using a Kennametal KDNR-4-SN4-15CB cutter under the conditions set out in Table IV. The width and length of cut was three inches by twenty-four inches (7.62 centimeters [cm] by 60.96 cm). The end of life (EOL) criteria for all of the tests was by a flank wear of 0.015 inches (0.381 mm). The tool life in minutes as set forth for Test No. 1 in Table IV reflects the actual chip cutting time for the cutting insert. The test results from Test No. 1 show that the tool life as measured in minutes for the ground and heat treated cutting inserts of Mixture I was about two and one-half times as great as that for the ground surface cutting inserts of Mixture I.

Referring to Test No. 2, this data reflect the results of a turning cycle test on Class 40 Gray Cast Iron. The results show for Mixture I that the ground and heat treated cutting insert had improved tool life of about twenty-seven percent (39.2 cycles/30.8 cycles) over the unground surface cutting insert and an improved tool life of about thirty-six percent (39.2 cycles/28.8 cycles) over the ground surface cutting insert.

Referring to Test Nos. 3 and 4 of Table IV, this data reflects the results of the use of a CNGX-434T (0.008 inches×20° K land) style cutting inserts in the turning of Class 30 Gray Cast Iron brake rotors. It is apparent that from Test No. 3 the nose wear for the ground and heat treated cutting insert was about eighteen percent less ($2.05 \times 10^{-4}$ inches vs. $2.5 \times 10^{-4}$ inches) than for the ground surface cutting insert. Test No. 4 shows that the average nose wear for the ground and heat treated cutting insert was about the same as for the ground surface cutting insert.

Referring to Test No. 5, a turning cycle test was performed on Class 40 Gray Cast Iron using ground and heat treated cutting inserts and ground surface cutting inserts. The turning cycle test emphasizes interrupted cutting in which sixteen cuts were made per cycle to reduce the bar diameter with a two inch length of cut per cut and a total cutting time per cycle of one minute. The results of these tests reflect the tool life as measured in minutes and where the end of life (EOL) criteria was 0.030 inches of nose wear (i.e., "nw"). The results show that there was a twenty-seven percent improvement in the tool life (12.7 minutes/10.0 minutes) in the turning of gray cast iron, as measured by minutes, between the ground surface cutting insert and the ground and heat treated cutting insert.

Referring to Tests Nos. 6 and 7, these tests pertain to the continuous turning of a round bar of ductile cast iron (80-55-06). The tool life, which comprised actual chip cutting time for the cutting insert, was measured in minutes wherein the EOL criteria was flank wear of 0.015 inches (0.381 mm). Tests Nos. 6 and 7 show that the tool life was about the same for the cutting inserts in a continuous turning test.

Referring to Test No. 8, these results concern the fly cut milling of Class 40 Gray Cast Iron (GCI) in the form of blocks with holes therein using a Kennametal KDNR-4-SN4-15CB cutter under the conditions set out in Table IV with cutting inserts of Mixture IV. The width and length of cut was three inches by twenty-four inches (7.62 centimeters [cm] by 60.96 cm). The end of life (EOL) criteria for all of the tests was by a flank wear of 0.015 inches (0.381 mm). The tool life in minutes as set forth for Test No. 8 in Table IV reflects the actual chip cutting time for the cutting insert. The tool life for the ground and heat treated cutting insert was about twenty percent (1.8 minutes/1.5 minutes) better than that for the ground surface cutting insert of Mixture IV.

TABLE IV

Metalcutting Test Results

| Mixture I/Test | Unground Surface | Ground Surface | Ground & Heat Treated |
|---|---|---|---|
| Test No. 1 Milling Class 40 GCI with holes: speed = 3000 surface feet per minute (sfm); chipload = 0.006 inches per tooth (ipt); Depth of Cut (DOC) = 0.08"; Insert SNGA433T[chamfer size = .008" × 20 degrees]; Dry | | 1.3 minutes | 3.2 minutes |
| Test No. 2 Turning Cycle Rectangular Class 40 GCI: speed = 1600 sfm; Feed = 0.012 inches per revolution (ipr); DOC = 0.1"; Dry | SNU433T/30.8 cycles | SNG433T/28.8 cycles | SNG433T/39.2 cycles |
| Test No. 3 Class 30 GCI Brake Disc turning/facing: Speed = 2500–3000 sfm; Feed = 0.006–0.024 ipr; Insert CNGX454T; Dry | | $2.5 \times 10^{-4}$ inches nose wear per part | $2.1 \times 10^{-4}$ inches nose wear per part $2.0 \times 10^{-4}$ inches nose wear per part |
| Test No. 4 Class 30 GCI Brake Disc turning/facing: Speed = 2500–3000 sfm; Feed = 0.006–0.024 ipr; Insert CNGX454T; Dry | | $2.6 \times 10^{-4}$ inches nose wear per part | $2.9 \times 10^{-4}$ inches nose wear per part $2.3 \times 10^{-4}$ inches nose wear per part |
| Test No. 5 Turning Cycle Class 40 GCI: Speed = 3000 sfm; Feed = 0.016 ipr; DOC = 0.07 inches; Insert CNGX454T; Dry | | 10 minutes | 12.7 minutes |
| Test No. 6 Turning DCI: Speed = 2000 sfm; Feed = 0.02 ipr; DOC = 0.1 inches; Insert SNGA433T; Dry | | 1.4 minutes | 1.4 minutes |

TABLE IV-continued

Metalcutting Test Results

| Mixture I/Test | Unground Surface | Ground Surface | Ground & Heat Treated |
|---|---|---|---|
| Test No. 7 Turning DCI: Speed = 1500 sfm; Feed = 0.015 ipr; DOC = 0.1 inches; Insert SNGA433T; Dry Mixture IV | | 1.8 minutes | 1.9 minutes |
| Test No. 8 Milling Class 40 GCI with holes: Speed = 3000 sfm; Chipload = 0.006 ipt; DOC = 0.08 inches; Insert SNG432T; Dry | | 1.5 minutes | 1.8 minutes |

In addition to conducting tests of the actual cutting insert performance in material removal applications, certain compositions were analyzed to ascertain their physical properties. In this regard, the physical properties of surface roughness, transverse rupture strength, hardness, and surface fracture resistance have been found to be indicative of the performance of a cutting insert. In addition, the microstructure of the cutting insert has been found to, in some cases, influence the performance of the cutting insert.

Table V below sets forth the test results of surface roughness measurements in microinches ($\mu$ inches) of cutting inserts of Mixture I wherein each cutting insert was in one of the three conditions (i.e., unground surface, ground surface, or ground and heat treated). The technique used to measure the surface roughness used a WYKO surface measuring system Model No. NT 2000 equipped with Vision 32 software. The surface roughness measurements were made in the vertical scanning interferometer mode at 10.2 magnifications with the tilt term removed and without filtering. The set up parameters were: size: 736×480, and sampling: 32.296 microinches. The WYKO surface measuring system is made by VEECO WYKO Corporation of Tucson, Ariz. (USA) 85706.

TABLE V

Surface Roughness of Cutting Inserts (Mixture I)

| Parameter/Condition | Unground Surface | Ground Surface | Ground & Heat Treated Surface |
|---|---|---|---|
| $R_a$ ($\mu$inches) | 43.6–58.8 | 18.3–22.2 | 54.8–60.5 |
| $R_q$ ($\mu$inches) | 62.4–82.0 | 23.0–29.2 | 69.2–76.1 |
| $R_z$ ($\mu$inches) | 1113–1492 | 298–551 | 603–744 |
| $R_t$ ($\mu$inches) | 1436–2378 | 408–704 | 736–1288 |

Table VI below sets forth the transverse rupture strength (TRS) in thousands of pounds per square inch (ksi) and the standard deviation for the transverse rupture strength, as well as the Weibull Modulus, for transverse rupture bars of Mixture I wherein each transverse rupture bar was in one of the three conditions (i.e., unground surface, ground surface, or ground & heat treated). The technique used to measure the transverse rupture strength comprised a three point bend test.

TABLE VI

Transverse Rupture Strength (ksi) for Transverse Rupture Bars of Mixture I

| Test/Condition | Unground Surface | Ground Surface | Ground & Heat Treated |
|---|---|---|---|
| TRS (ksi) | 113 | 169 | 108 |
| Std Deviation (ksi) | 8 | 6 | 8 |
| Weibull Modulus | 17 | 32 | 16 |

These test results show that the ground and heat treated transverse rupture bars had poorer (i.e., less) transverse rupture strength than did the ground surface transverse rupture bars of the same composition. It appears that the reason for this difference in the transverse rupture strength is due to the fact that the ground and heat treated transverse rupture bars had a greater surface roughness than the ground surface transverse rupture bars. Furthermore, the surface of the ground and heat treated transverse rupture bar (Mixture I) showed needle-like grains which were absent from the surface of the ground surface transverse rupture bar (Mixture I).

Table VII below sets forth the critical load in kilograms, which reflects the surface fracture resistance, for cutting inserts of Mixture I wherein each cutting insert was in one of the three conditions (i.e., unground surface, ground surface, or ground & heat treated). The technique used to measure the surface fracture resistance comprised an indentation test using a Rockwell hardness tester equipped with a brale diamond indenter at loads of 18 kilograms, 33 kilograms, 48 kilograms and 70 kilograms. At each load, the specimen was visually examined at 64× to determine the presence or absence of cracks in the surface so as to thereby ascertain the critical load at which cracks first appear in the surface of the cutting insert.

TABLE VII

Fracture Resistance: Critical Load as Measured in Kilograms for Cutting Inserts of Mixtures I through VII

| Mixture/Condition | Unground Surface | Ground Surface | Ground & Heat Treated |
|---|---|---|---|
| I | 48 | 33 | 70+ |
| II | 18 | 33 | 48 |
| III | 70+ | 33 | 70 |

TABLE VII-continued

Fracture Resistance: Critical Load
as Measured in Kilograms
for Cutting Inserts of Mixtures I through VII

| Mixture/Condition | Unground Surface | Ground Surface | Ground & Heat Treated |
|---|---|---|---|
| IV | 70+ | 33 | 70+ |
| V | 48 | 33 | 70+ |
| VI |  | 48 | 70+ |
| VII |  | 33 | 70+ |

The above test results show that for most of the cutting inserts the ground and heat treated cutting inserts displayed the highest critical load. One exception was in the case of Mixture III where the unground surface cutting inserts had a higher (70+kilograms) critical load than the critical load (70 kilograms) of the ground and heat treated cutting inserts. The other exception was in the case of Mixture IV where the critical load of the ground and heat treated cutting insert was the same (i.e., 70+kilograms) as that for the unground surface cutting insert.

Table VIII below presents the finish tolerances for cutting inserts of Mixture I wherein each cutting insert was in one of the three conditions (i.e., unground molded surface, ground surface, or ground & heat treated).

TABLE VIII

Finish Tolerances for Cutting Insert

| IC Tolerance (+/-) | Unground Molded Surface | Ground Surface | Ground & Heat Treated |
|---|---|---|---|
| 'G' 0.001 inches |  | X | X |
| 'M' 0.003 inches | X |  |  |
| 'U' 0.005 inches | X |  |  |

This Table VIII above shows that the ground and heat treated cutting inserts met the "G" tolerance requirements whereas the unground molded cutting inserts only met the "M" and "U" tolerance requirements. The dimensional control of the machined workpieces is much better with the use of "G" tolerance cutting inserts as compared to the use of either "M" tolerance cutting inserts or "U" tolerance cutting inserts.

Table IX sets out the results of hardness testing of cutting inserts made of Mixture I using a Vickers Hardness Test with a load of 50 grams and a load of 100 grams. Low angle polishing of the surface of the material specimens was used to make these hardness measurements close to the surface.

Table IX shows that the ground & heat treated cutting inserts exhibited a higher hardness near the surface of the material (i.e., in a surface region extending about 0.030 inches [0.762 mm] from the surface) than did the ground surface cutting inserts of Mixture I or unground surface cutting inserts of Mixture I. These test results also show that the surface region of the ground and heat treated cutting inserts (of Mixture I) presented a higher hardness than the bulk substrate thereof since the hardness of the bulk substrate of the ground and heat treated cutting inserts equates to the hardness of the ground surface cutting inserts.

TABLE IX

Summary of Average Hardnesses
of Cutting Inserts of Mixture I

| Cutting Insert (Condition & Style) | Load (grams) | Average (VHN) |
|---|---|---|
| Ground Surface SNG433T | 50 | 1805 ± 42 |
| Ground Surface SNG433T | 100 | 2385 ± 83 |
| Unground Surface SPG432 | 50 | 2068 ± 26 |
| Unground Surface SPG432 | 100 | 2419 ± 30 |
| Ground & Heat Treated SNG433T | 50 | 2267 ± 55 |
| Ground & Heat Treated SNG433T | 100 | 2643 ± 47 |

Figure 2:
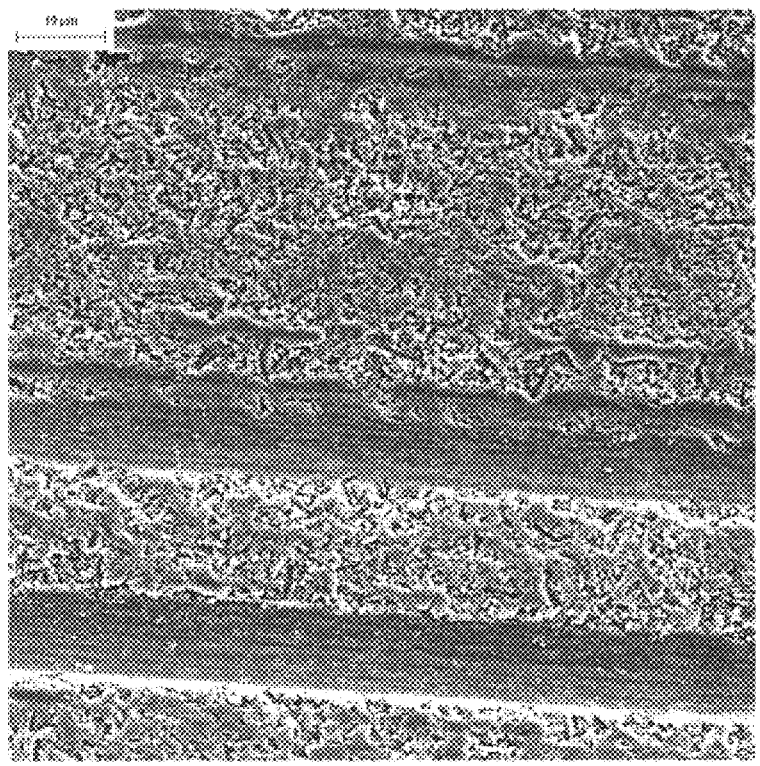
FIG. 2 is a scanning electron microscope (SEM) photomicrograph which depicts secondary electron images (SEI) at a magnification of 1000X of the rake surface of a ground surface cutting insert of Mixture I.
Figure 3:
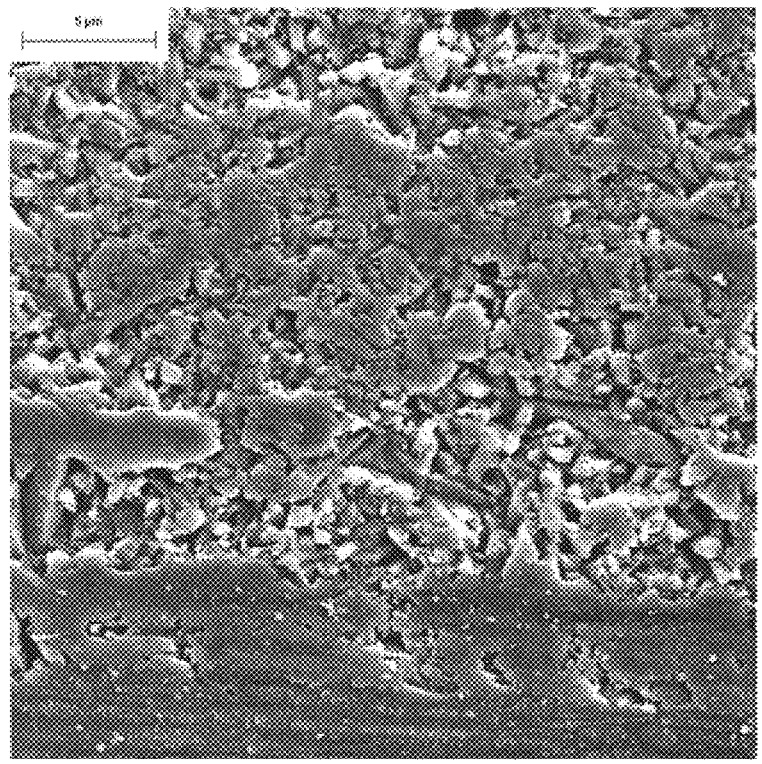
FIG. 3 is a scanning electron microscope (SEM) photomicrograph which depicts secondary electron images (SEI) at a magnification of 3000X of the rake surface of a ground surface cutting insert of Mixture I.

Analyses were performed to ascertain the phases present and surface morphology of the ground surface cutting inserts, the unground surface cutting inserts, and the ground and heat treated cutting inserts. Referring to FIGS. 2 and 3, it was found that the surface region of the ground surface cutting insert had grind lines and a relatively flattened structure. An X-ray diffraction analysis showed that the surface region of the ground surface cutting insert comprised only beta silicon nitride.

Figure 4:
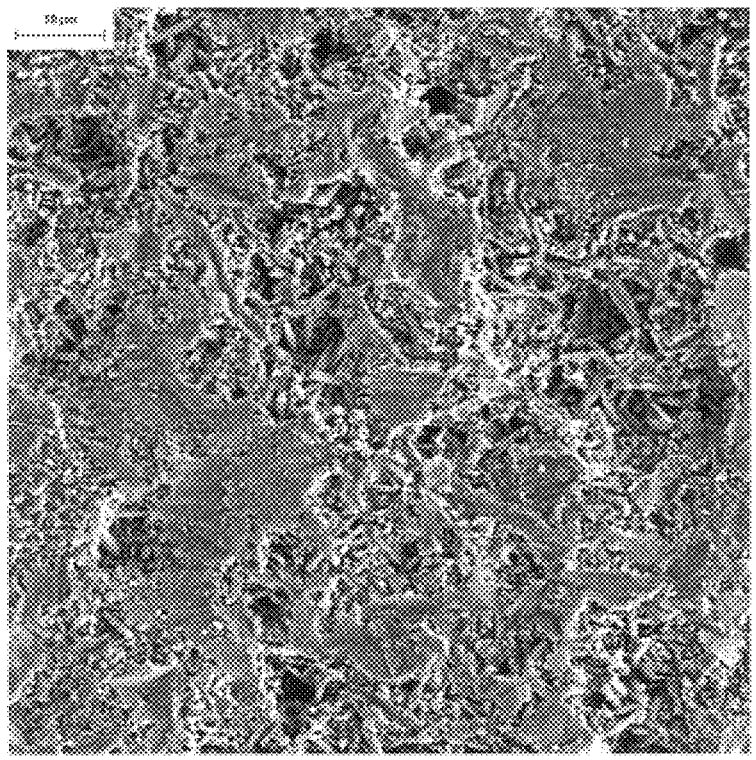
FIG. 4 is a scanning electron microscope (SEM) photomicrograph which depicts secondary electron images (SEI) at a magnification of 1000X of the rake surface of a ground and heat treated cutting insert of Mixture I.
Figure 5:
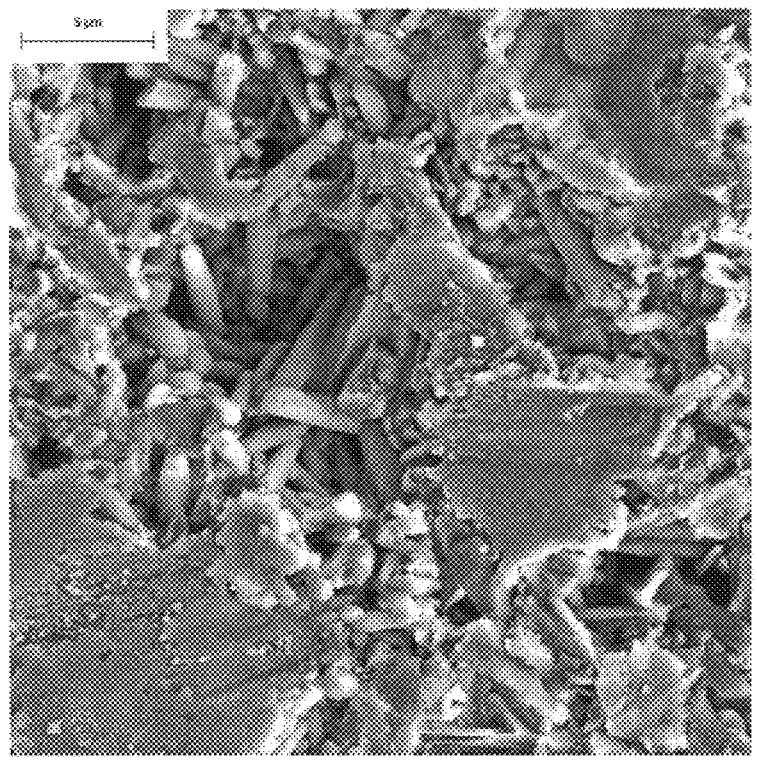
FIG. 5 is a scanning electron microscope (SEM) photomicrograph which depicts secondary electron images (SEI) at a magnification of 3000X of the rake surface of a ground and heat treated cutting insert of Mixture I.

Referring to FIGS. 4 and 5, these photomicrographs show a mixture of ground surfaces and unground surfaces characterized by acicular grain structure. An X-ray diffraction analysis showed that the surface region of the ground and heat treated ground cutting insert has present a beta silicon nitride phase and a $Y_2Si_3O_3N_4$ phase.

Figure 6:
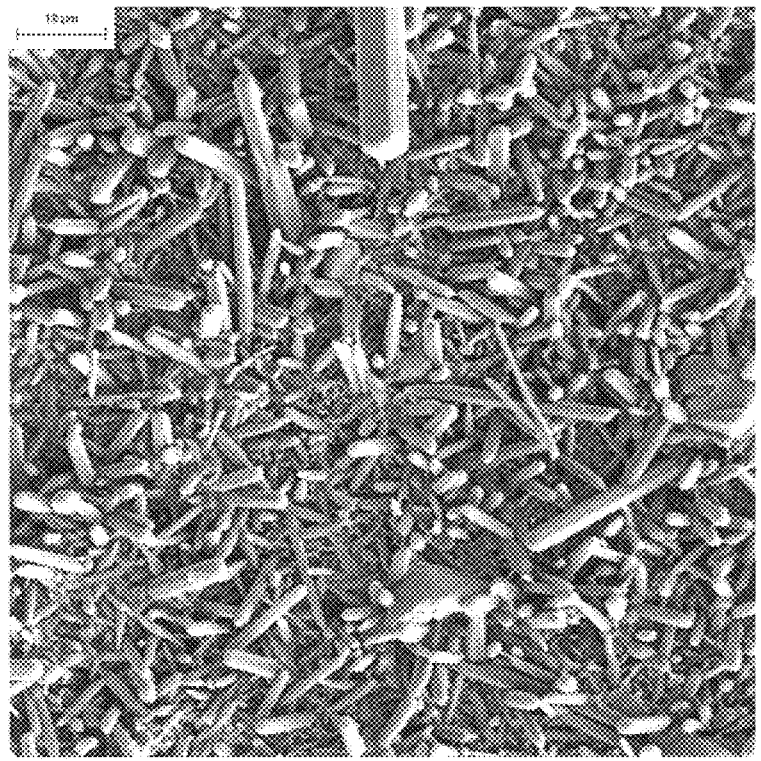
FIG. 6 is a scanning electron microscope (SEM) photomicrograph which depicts secondary electron images (SEI)
Figure 7:
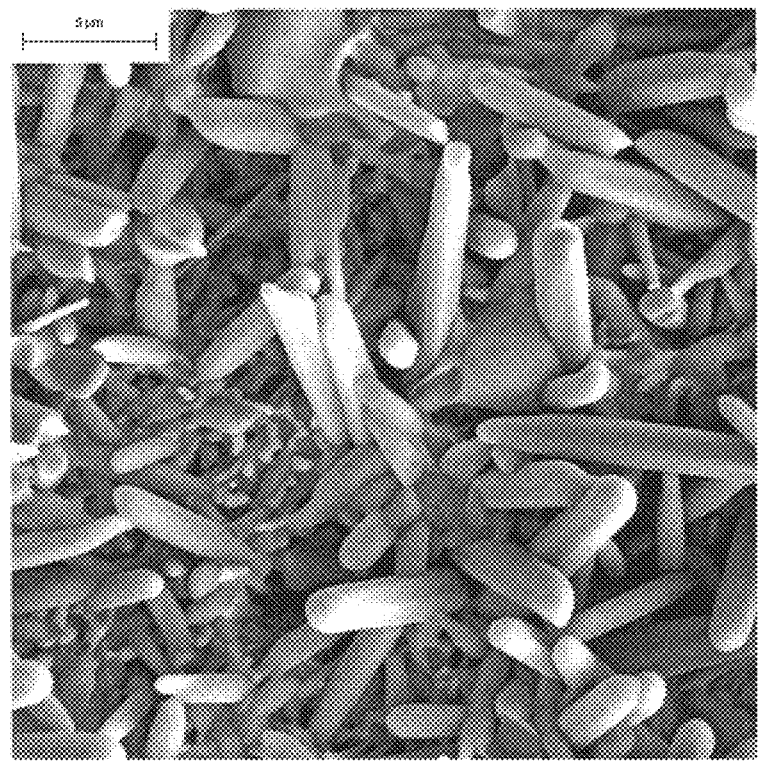
FIG. 7 is a scanning electron microscope (SEM) photomicrograph which depicts secondary electron images (SEI) at a magnification of 3000X of the rake surface of an unground surface cutting insert flank of Mixture I.

Referring to FIGS. 6 and 7, these photomicrographs show unground surfaces characterized by needle-like grain structure. An X-ray diffraction analysis showed that the surface region of the unground surface cutting insert had present a beta silicon nitride phase, and a $Y_2Si_3O_3N_4$ phase, and a silicon metal phase.

In the heat treatment step of the processing, the setting powder and/or the atmosphere may be tailored to provide controlled surface characteristics for a surface region (i.e., a volume of material extending from the surface inwardly toward the bulk substrate for a specific distance) as compared to the bulk substrate. One may consider the setting powder and/or the atmosphere a reaction source, i.e., a source for the reaction elements. For example, one may be able to achieve a wear resistant surface region in combination with a tougher bulk region. In regard to the setting powder, where it is desired to impart one or more of the following metals and/or their oxides and/or carbides into the surface region of the substrate, one may use a setting powder that contains one or more of the following and/or their reaction products: the oxides of aluminum, hafnium, zirconium, yttrium, magnesium, calcium and the metals of the lanthanide series of the elements; and the nitrides and/or carbides of silicon, titanium, hafnium, aluminum, zirconium, boron, niobium and carbon.

Another way to control the reaction with the surface to provide controlled surface characteristics is by the use of a gas or gases from the group comprising nitrogen, argon, and carbon monoxide/carbon dioxide. The pressure of these gases may range between sub-atmospheric and about 30,000 psi.

In another example, a Mixture IV β' sialon composition cutting insert was sintered and ground as described before and then heat treated at 1750 degrees Centigrade for sixty minutes under 15–20 ksi nitrogen isostatic pressure in a setting powder of $Si_3N_4$, $Al_2O_3$, $Y_2O_3$, and optionally BN, and their reaction products. A comparison of x-ray diffraction traces obtained from the ground surface and then from the heat treated surface showed the following:

| PRIOR ART<br>Ground Surface Phases | INVENTION<br>Ground and Heat Treated Surface Phases | |
|---|---|---|
| β' sialon<br>B phase, YAM,<br>wollastonite, and<br>intergranular glass | 26.6 w/o α' sialon<br>73.4 w/o β' sialon<br>and minor amounts<br>of melilite,<br>B phase and<br>intergranular glass | 34.8 w/o α' sialon<br>65.2 w/o β' sialon<br>and minor amounts<br>of melilite, YAM,<br>B phase and<br>intergranular glass |

These heat treated and ground inserts of Mixture III were tested in metalcutting a modified Waspalloy Jet Engine, seven inch diameter main shaft, under the following rough turning conditions: 676 sfm, 0.008 ipr, 0.180 inch depth of cut, and a four inch length of cut. The ground and heat treated Mixture III material was indexed due to depth of cut notching and produced a workpiece surface finish of 56 RMS while the ground Mixture III material was indexed due to depth of cut notching and chipping and produced a poorer surface finish of 250 RMS.

This test demonstrates that a cutting tool having a β' sialon bulk microstructure and a α'+β' sialon surface microstructure can be produced by the present invention. It is also believed that cutting tools having a β silicon nitride bulk microstructure and β' sialon or a α'+β' sialon surface microstructure are also produceable by the present invention. To produce these microstructures, it is believed that the setting powder used in the heat treating step should contain, in addition to $Si_3N_4$, up to 50 weight percent (w/o) of AlN and/or $Al_2O_3$, and minor amounts of $Y_2O_3$ (or a lanthanide oxide) to help control the a' sialon produced in the surface.

Table X set forth below presents the results of the measurement by X-ray fluorescence of the aluminum content on the surface of cutting inserts of Mixture I wherein the cutting inserts were in one of three conditions (i.e., unground surface, ground surface, or ground & heat treated).

TABLE X

Measurement by X-Ray Fluorescence
of the Aluminum Content
on the Surface of Cutting Inserts of Mixture I

| Condition of the Cutting<br>Insert | Aluminum in Weight Percent<br>on the Surface as Measured<br>by X-Ray Fluorescence |
|---|---|
| Ground Surface | less than 10 ppm (parts per million) |
| Unground Surface | 0.21 to 0.3 |
| Ground & Heat Treated | 1.4 to 1.5 |

Referring to the results set forth in Table X above, this data shows that as a result of the heat treatment the content of the aluminum on the surface increased. The aluminum was obtained from the setting powder which contained alumina. This increase in aluminum may lead to an alloyed surface region (or layer) that has better properties such as, for example, increased wear resistance, increased hardness, and higher fracture resistance.

In another example, a ground cutting insert of Mixture I was heat treated at 1750 degrees Centigrade for 120 minutes under an isostatic pressure of 1500 psi of nitrogen and a silicon nitride based setting powder containing, as disclosed previously herein for Mixture I, but also containing 10 w/o of titanium nitride. X-ray diffraction and x-ray fluorescence analysis of the heat treated surface, respectively found: the presence of beta silicon nitride, with trace amounts of titanium nitride (TiN) and yttrium silicate ($Y_2SiO_5$) phases; and 5.8 w/o of titanium. It is expected that the addition of titanium nitride (or other materials) in this manner will avoid the problems associated with applying a coating of the same material to the heat treated material; namely, coating adhesion and/or thermal cracks in the coating, while providing a metalcutting performance benefit in certain applications (e.g., milling of class 40 gray cast iron).

Alternatively, the setting powder and/or the reactive atmosphere may help to deplete one or more undesirable (or selected) constituents from the surface region which would then lead to a compositional difference between the surface region and the bulk region. Such a compositional difference may also lead to improved performance, as well as improved properties, for the ground and heat treated cutting inserts as compared to the ground surface cutting inserts.

It seems apparent that applicant has provided an improved method for the production of a ceramic cutting tool including a silicon nitride-based cutting tool, a SiAlON-based cutting tool, an alumina-based cutting tool, a titanium carbonitride-based cutting tool, and a whisker-reinforced ceramic cutting tool. It is also apparent that applicant has provided an improved ceramic cutting tool wherein the cutting tool is a silicon nitride-based cutting tool, a SiAlON-based cutting tool, an alumina-based cutting tool, a titanium carbonitride-based cutting tool, or a whisker-reinforced ceramic cutting tool.

The performance tests reveal that for most cases the ground and heat treated cutting inserts experienced better performance than either the ground surface cutting inserts or the unground cutting inserts in milling and rough turning applications. The physical properties of the ground and heat treated cutting inserts were comparable to those of the ground surface cutting inserts. The microstructure of the ground and heat treated cutting inserts is different from that of either the ground surface cutting insert or the unground cutting inserts.

As an optional feature, the cutting inserts may be coated with a refractory coating (e.g., alumina, titanium nitride, titanium carbide, titanium carbonitride or titanium aluminum nitride). The coating may be applied by physical vapor deposition (PVD) techniques or by chemical vapor deposition (CVD) techniques. In the case where the coating scheme comprises multiple layers, at least one layer may be applied by CVD and at least one layer may be applied by PVD. Applicant expects that coated cutting tools would be suitable for the machining of gray cast iron, ductile iron, steels, and nickel-based alloys.

The patents and other documents identified herein are hereby incorporated by reference herein.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. A heat treated ground ceramic cutting insert formed in the presence of a reaction source, the cutting insert comprising:

a substrate having a surface which defines a rake face and a flank face wherein there is a cutting edge at the intersection of the rake face and the flank face;

the substrate presenting a microstructure wherein there being a surface region extending inwardly from the surface of the substrate, and there being a bulk region inwardly of the surface region;

the bulk region having a bulk composition;

the surface region having a surface composition resulting from a reaction at a temperature between about 1300 degrees Centigrade and about 2200 degrees Centigrade with the reaction source wherein the surface composition being different from the composition of the bulk region;

wherein the surface region has a first microstructure and a first hardness; and the bulk region having a second microstructure and a second hardness; the first microstructure of the surface region being different from the second microstructure of the bulk region; and the first hardness of the surface region being greater than the second hardness of the bulk region; and wherein the substrate comprising a silicon nitride-based composition, and the first microstructure of the surface region comprising β-silicon nitride phase and $Y_2Si_3O_3N_4$ phase, and the second microstructure of the bulk region comprising β-silicon nitride.

2. A heat treated sound ceramic cutting insert formed in the presence of a reaction source, the cutting insert comprising:

a substrate having a surface which defines a rake face and a flank face wherein there is a cutting edge at the intersection of the rake face and the flank face;

the substrate presenting a microstructure wherein there being a surface region extending inwardly from the surface of the substrate, and there being a bulk region inwardly of the surface region;

the bulk region having a bulk composition;

the surface region having a surface composition resulting from a reaction at a temperature between about 1300 degrees Centigrade and about 2200 degrees Centigrade with the reaction source wherein the surface composition being different from the composition of the bulk region;

wherein the surface region has a first microstructure and a first hardness; and the bulk region having a second microstructure and a second hardness; the first microstructure of the surface region being different from the second microstructure of the bulk region; and the first hardness of the surface region being greater than the second hardness of the bulk region; and wherein the substrate comprising a Sialon-based composition; and the first microstructure of the surface region comprises β'-Sialon, α'-Sialon and N-YAM; and the second microstructure of the bulk region comprises a mixture of α'-SiAlON and β'-SiAlON.

3. A heat treated ground ceramic cutting insert formed in the presence of a reaction source, the cutting insert comprising:

a substrate having a surface which defines a rake face and a flank face wherein there is a cutting edge at the intersection of the rake face and the flank face;

the substrate presenting a microstructure wherein there being a surface region extending inwardly from the surface of the substrate, and there being a bulk region inwardly of the surface region;

the bulk region having a bulk composition;

the surface region having a surface composition resulting from a reaction at a temperature between about 1300 degrees Centigrade and about 2200 degrees Centigrade with the reaction source wherein the surface composition being different from the composition of the bulk region;

wherein the surface region has a first microstructure and a first hardness; and the bulk region having a second microstructure and a socond hardness; the first microstructure of the surface region being different from the second microstructure of the bulk region; and the first hardness of the surface region being greater than the second hardness of the bulk region; and wherein the substrate comprising a Sialon-based composition; and the first microstructure of the surface region comprises β'-Sialon and 15R phase; and the second microstructure of the bulk region consists essentially of β'-SiAlON.

4. A heat treated ground ceramic cutting insert formed in the presence of a reaction source, the cutting insert comprising:

a substrate having a surface which defines a rake face and a flank face wherein there is a cutting edge at the intersection of the rake face and the flank face;

the substrate presenting a microstructure wherein there being a surface region extending inwardly from the surface of the substrate, and there being a bulk region inwardly of the surface region;

the bulk region having a bulk composition;

the surface region having a surface composition resulting from a reaction at a temperature between about 1300 degrees Centigrade and about 2200 degrees Centigrade with the reaction source wherein the surface composition being different from the composition of the bulk region;

wherein the surface region has a first microstructure and a first hardness; and the bulk region having a second microstructure and a second hardness; the first microstructure of the surface region being different from the second microstructure of the bulk region, and the first hardness of the surface region being greater than the second hardness of the bulk region; and wherein the substrate comprising a Sialon-based composition; and the first microstructure of the surface region comprises β-Sialon and N-Melilite; and the second microstructure of the bulk region consists essentially of β'-SiAlON, B-phase and N-α-Wollastonite.

5. A heat treated ground ceramic cutting insert formed in the presence of a reaction source, the cutting insert comprising:

a substrate having a surface which defines a rake face and a flank face wherein there is a cutting edge at the intersection of the rake face and the flank face;

the substrate presenting a microstructure wherein there being a surface region extending inwardly from the surface of the substrate, and there being a bulk region inwardly of the surface region;

the bulk region having a bulk composition;

the surface region having a surface composition resulting from a reaction at a temperature between about 1300 degrees Centigrade and about 2200 degrees Centigrade with the reaction source wherein the surface composition being different from the composition of the bulk region;

wherein the surface region has a first microstructure and a first hardness; and the bulk region having a second microstructure and a second hardness; the first microstructure of the surface region being different from the second microstructure of the bulk region; and the first hardness of the surface region being greater than the second hardness of the bulk region; and wherein the substrate includes alumina, zirconia and silicon carbide whiskers; and the first microstructure of the surface region comprises alumina, tetragonal zirconia, monoclinic zirconia, silicon carbide, $MgAi_2O_4$, and ZrO/ZrC; and the second microstructure of the bulk region comprises alumina, monoclinic zirconia, tetragonal zirconia, silicon carbide and $MgAl_2O_4$.

* * * * *